United States Patent
Takayama et al.

(12) 
(10) Patent No.: US 12,554,094 B2
(45) Date of Patent: Feb. 17, 2026

(54) LENS BARREL AND KNOB FALLING-OFF PREVENTION MEMBER

(71) Applicant: Kowa Company, Ltd., Nagoya (JP)

(72) Inventors: Jun Takayama, Soka (JP); Syuichi Tominaga, Nagoya (JP)

(73) Assignee: Kowa Company, Ltd., Nagoya (JP)

( * ) Notice: Subject to any disclaimer, the term of this patent is extended or adjusted under 35 U.S.C. 154(b) by 321 days.

(21) Appl. No.: 18/262,889

(22) PCT Filed: Jan. 27, 2022

(86) PCT No.: PCT/JP2022/003157
§ 371 (c)(1),
(2) Date: Jul. 25, 2023

(87) PCT Pub. No.: WO2022/163773
PCT Pub. Date: Aug. 4, 2022

(65) Prior Publication Data
US 2024/0085655 A1    Mar. 14, 2024

(30) Foreign Application Priority Data
Jan. 28, 2021    (JP) .................................. 2021-011973

(51) Int. Cl.
*G02B 7/02*    (2021.01)
(52) U.S. Cl.
CPC ............. *G02B 7/022* (2013.01); *G02B 7/023* (2013.01)
(58) Field of Classification Search
CPC ........ G02B 7/022; G02B 7/023; G02B 7/026; G03B 2217/002; G03B 17/02
See application file for complete search history.

(56) References Cited

FOREIGN PATENT DOCUMENTS

| JP | H09281546 A | 10/1997 | | |
|---|---|---|---|---|
| JP | 2006251581 A | 9/2006 | | |
| JP | 2008052193 A | 3/2008 | | |
| JP | WO2013121832 A1 | * | 5/2015 | ............. G03B 17/12 |
| WO | WO-2013121832 A1 | * | 8/2013 | ............. G03B 17/12 |
| WO | 2022163773 A1 | 8/2022 | | |

OTHER PUBLICATIONS

International Search Report and Written Opinion (English translation for ISR only) for International Patent Application No. PCT/JP2022/003157 dated Mar. 15, 2022, pp. all.
Extended European Search Report for EP Application No. 22745992.2, dated Dec. 10, 2024, pp. all.
Notification of Reasons for Refusal for Japanese Patent Application No. 2022-578487, dated Sep. 30, 2025, pp. all.

* cited by examiner

*Primary Examiner* — James C. Jones
(74) *Attorney, Agent, or Firm* — Dorsey & Whitney LLP

(57) ABSTRACT

According to one or more embodiments of the disclosure, a lens barrel includes an operation member and a knob. The operation member is disposed to be rotatable in a circumferential direction with respect to a lens barrel body. The knob is restricting and fixing rotation of the operation member in the circumferential direction. The lens barrel further includes a knob falling-off prevention member capable of switching between a first state of making the knob detachable from the lens barrel body and a second state of making the knob non-detachable from the lens barrel body.

6 Claims, 16 Drawing Sheets

LENS BARREL AND KNOB FALLING-OFF PREVENTION MEMBER

CROSS-REFERENCE TO RELATED APPLICATION(S)

This application is a continuation of PCT Application No. PCT/JP2022/003157 filed Jan. 27, 2022, which claims priority to Japanese Application No. 2021-011973 filed Jan. 28, 2021, which are incorporated herein by reference, in their entirety, for any purpose.

TECHNICAL FIELD

The present invention relates to a lens barrel and a knob falling-off prevention member.

BACKGROUND ART

Conventionally, a camera lens barrel mounted on a camera is provided with a member used for an operation for adjusting a built-in focus function or an iris function. In general, a fixing member called a knob is used to fix a positional relationship of members after adjusting the focus function or the iris function.

For example, Patent Literature 1 discloses a technique in which a fixing member is screwed to a member used for an operation, and a distal end of the fixing member is pushed into an inner member, so that movement of the fixing member is restricted by a frictional force between the fixing member and the inner member, and as a result, the member used for the operation is fixed.

CITATION LIST

Patent Literature

Patent Literature 1: JP H09-281546 A

SUMMARY OF INVENTION

Technical Problem

However, in the technique described in Patent Literature 1, since the knob as the fixing member is a screw type fixing, the knob itself can be removed by loosening the screw. Therefore, when the focus function or the iris function is adjusted, the knob may be erroneously detached and may fall off. In addition, in addition to the time of adjusting the focus function or the iris function, there is also a possibility that the screw of the knob is loosened due to, for example, vibration or impact caused by an environmental factor at a place where the camera is placed being applied to the lens barrel, and the loosening increases and the knob falls off.

An object of the present invention is to provide a lens barrel capable of preventing a fixing member from falling off.

Solution to Problem

A lens barrel according to the present invention includes: an operation member disposed to be rotatable in a circumferential direction with respect to a lens barrel body; and a knob for restricting and fixing rotation of the operation member in the circumferential direction, in which the lens barrel includes a knob falling-off prevention member capable of switching between a first state of making the knob detachable from the lens barrel body and a second state of making the knob non-detachable from the lens barrel body.

Furthermore, in the lens barrel according to the present invention, the knob is a falling-off prevention screw including a first body portion that is threaded, a second body portion having a smaller diameter than that of the first body portion and is not threaded, and a third body portion having a larger diameter than that of the second body portion and a diameter equal to or smaller than that of the first body portion, the operation member includes a screw hole that can be screwed by the first body portion of the knob, and the knob falling-off prevention member includes a keyhole formed by communicating a first hole through which the third body portion of the knob can be inserted and a second hole through which the third body portion cannot be inserted, and switches between the first state and the second state by changing a position of the keyhole with respect to the second body portion of the knob.

Furthermore, in the lens barrel according to the present invention, the keyhole is formed such that the first hole and the second hole communicate with each other in the circumferential direction of the knob falling-off prevention member, and the knob falling-off prevention member is disposed rotatably in the circumferential direction, and switches between the first state and the second state by rotating the position of the keyhole with respect to the second body portion of the knob in the circumferential direction.

Furthermore, in the lens barrel according to the present invention, the keyhole is formed such that the first hole and the second hole communicate with each other in an axial direction of the knob falling-off prevention member with respect to the lens barrel body, and the knob falling-off prevention member is disposed movably in the axial direction with respect to the lens barrel body, and switches between the first state and the second state by moving the position of the keyhole with respect to the second body portion of the knob in the axial direction.

A knob falling-off prevention member according to the present invention is a knob falling-off prevention member mounted on a lens barrel, the lens barrel including: an operation member disposed to be rotatable in a circumferential direction with respect to a lens barrel body; and a knob for restricting and fixing rotation of the operation member in the circumferential direction, in which the knob falling-off prevention member is switchable between a first state of making the knob detachable from the lens barrel body and a second state of making the knob non-detachable from the lens barrel body.

Advantageous Effects of Invention

According to the present invention, it is possible to provide a lens barrel capable of preventing a fixing member from falling off.

DESCRIPTION OF EMBODIMENTS

Hereinafter, examples of embodiments of the present invention will be described with reference to the drawings. Note that various constituent elements in the examples of the embodiments described below can be appropriately combined as long as no contradiction or the like occurs. In addition, description of contents described as an example of an embodiment may be omitted in other embodiments.

First Embodiment

First, an example of a lens barrel 100 according to a first embodiment of the present invention will be described with reference to FIG. 1.

Figure 1:
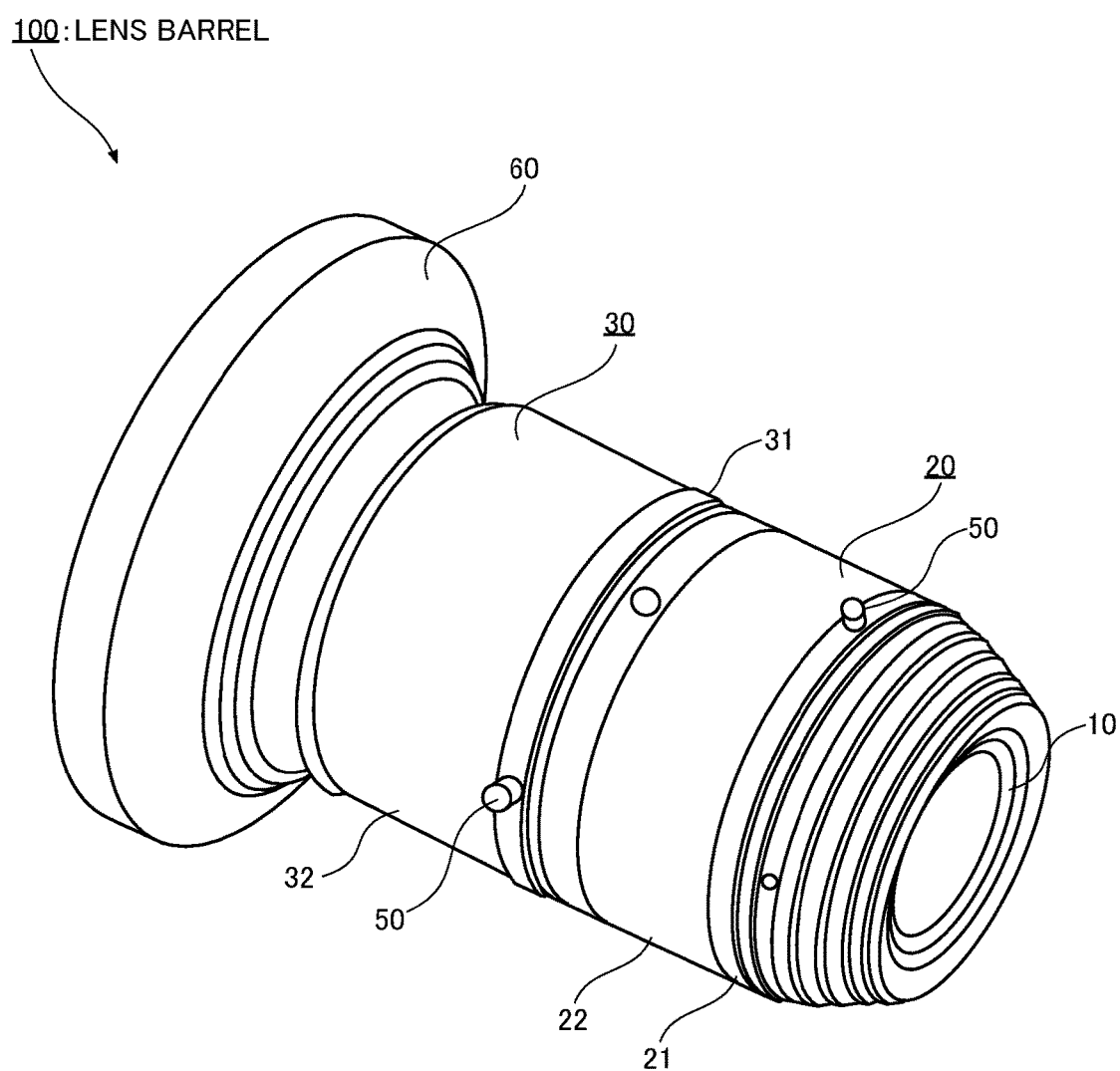
FIG. 1 is an explanatory diagram illustrating an example of an external configuration of a lens barrel 100 corresponding to at least one of embodiments of the present invention.

FIG. 1 is an explanatory diagram illustrating an example of an external configuration of the lens barrel 100 corresponding to at least one of embodiments of the present invention.

The lens barrel 100 is configured to be detachable from a camera body (not illustrated), and can be replaced according to a purpose of use. The lens barrel 100 includes a mounting portion 10, a first barrel 20, a second barrel 30, knobs 50, and a lens hood 60.

The mounting portion 10 has a function of mounting the lens barrel 100 to the camera body. For example, the mounting portion 10 is mounted on the camera body by being screwed to the camera body. A configuration of the mounting portion 10 is not particularly limited as long as the lens barrel 100 can be mounted to the camera body. Note that a rear lens may be provided in the mounting portion 10.

The first barrel 20 is a member rotatably mounted on an outer periphery of the lens barrel 100. The first barrel 20 functions as an operation member used for an operation related to a lens. The first barrel 20 includes a screw hole forming portion 21 and a first barrel body portion 22. The screw hole forming portion 21 and the first barrel body portion 22 are integrated to rotate the first barrel 20 in a circumferential direction, whereby a focus function and an iris function are adjusted. The screw hole forming portion 21 is provided on the mounting portion 10 side of the first barrel 20. Note that the screw hole forming portion 21 may be provided on the second barrel 30 side of the first barrel 20. The screw hole forming portion 21 is formed with a screw hole that can be screwed by a knob 50 to be described later, and is fixed to a knob falling-off prevention member 40 (not illustrated in FIG. 1) to be described later by the knob 50.

The second barrel 30 is a member rotatably mounted on the outer periphery of the lens barrel 100. The second barrel 30 functions as an operation member used for the operation related to the lens. The second barrel 30 includes a screw hole forming portion 31 and a second barrel body portion 32. The screw hole forming portion 31 and the second barrel body portion 32 are integrated to rotate the second barrel 30 in the circumferential direction, whereby the focus function and the iris function are adjusted. The screw hole forming portion 31 is provided on the first barrel 20 side of the second barrel 30. Note that the screw hole forming portion 31 may be provided on the lens hood 60 side of the second barrel 30. The screw hole forming portion 31 is formed with a screw hole that can be screwed by the knob 50 to be described later, and is fixed to the knob falling-off prevention member 40 (not illustrated in FIG. 1) to be described later by the knob 50. An inner barrel 90 (not illustrated in FIG. 1) to be described later is disposed inside the first barrel 20 and the second barrel 30.

The knob 50 is a member for restricting and fixing the screw hole forming portion 31 from rotating in the circumferential direction. The knob 50 is screwed into the screw hole of the screw hole forming portion 31 and pressed against the inner barrel 90 to fix a position thereof with respect to the inner barrel 90. Then, by fixing a position of the knob 50 with respect to the inner barrel 90, a position of the screw hole forming portion 31 to which the knob 50 is screwed with respect to the inner barrel 90 is also fixed. Details of the configuration of the knob 50 and details of a fixing method by the knob 50 will be described later.

The lens hood 60 is mounted on a distal end portion of the second barrel 30, and has a function of blocking light from an outside of an imaging screen and preventing the lens from being subjected to impact, dirt, or the like. A front lens (not illustrated) may be provided at a distal end portion of the lens hood 60.

Next, an example of each configuration of the screw hole forming portion 31, the knob falling-off prevention member 40, and the knob 50 corresponding to at least one of embodiments of the present invention will be described with reference to FIGS. 2 to 4. Note that since the knob falling-off prevention member 40 and the knob 50 for fixing the first barrel 20 and the knob falling-off prevention member 40 and the knob 50 for fixing the second barrel 30 have substantially the same configuration, the configuration of the knob falling-off prevention member 40 and the knob 50 in the second barrel 30 will be described in the following description.

Figure 2:
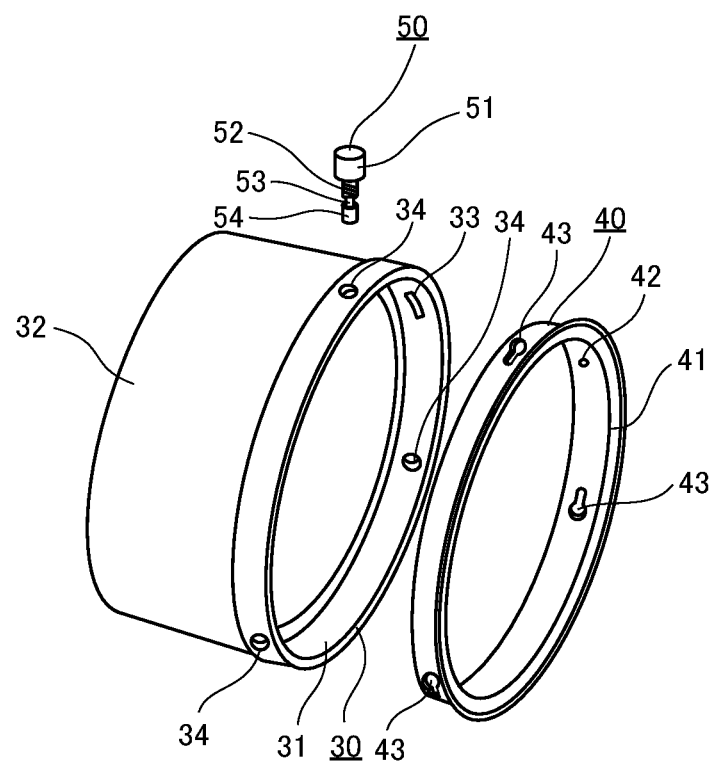
FIG. 2 is an explanatory diagram for explaining an example of each configuration of a screw hole forming portion 31, a knob falling-off prevention member 40, and a knob 50 corresponding to at least one of embodiments of the present invention.

FIG. 2 is an explanatory diagram for explaining an example of each configuration of the screw hole forming portion 31, the knob falling-off prevention member 40, and the knob 50 corresponding to at least one of embodiments of the present invention. FIG. 2 illustrates the second barrel 30, the knob falling-off prevention member 40, and the knob 50.

The knob 50 is a falling-off prevention screw including a holding portion 51, a first body portion 52, a second body portion 53, and a third body portion 54. The holding portion 51 is a member for holding the knob 50 by being pinched by an operator. The holding portion 51 preferably has a larger diameter than that of the first body portion 52. The first body portion 52 is threaded. The second body portion 53 has a smaller diameter than that of the first body portion 52 and is not threaded. The third body portion 54 has a larger diameter than that of the second body portion 53 and has a diameter equal to or smaller than that of the first body portion 52. Note that the third body portion 54 may be threaded.

As described above, the second barrel 30 includes the screw hole forming portion 31 and the second barrel body portion 32.

The screw hole forming portion 31 is a member including an elongated hole 33 and a screw hole 34. In the example illustrated in FIG. 2, the screw hole forming portion 31 is an annular member, but the shape of the screw hole forming portion 31 is not particularly limited. For example, the screw hole forming portion 31 may have a shape of a part of an annular shape, or a rectangular parallelepiped shape.

The elongated hole 33 is a hole for fixing the second barrel 30 and the knob falling-off prevention member 40. The shape of the elongated hole 33 is not particularly limited, but the length in the longitudinal direction of the elongated hole 33 is equal to or longer than the length in the longitudinal direction of a keyhole 43 described later. Note that the elongated hole is for making it possible to switch between a first state and a second state in a state where a fixing screw described later is loosened but cannot be removed. As long as the hole is used to fix the second barrel 30 and the knob falling-off prevention member 40, the hole is not necessarily the elongated hole.

The screw hole 34 is a hole that can be screwed by the first body portion 52 of the knob 50. Further, the screw hole 34 is formed such that the second body portion 53 and the third body portion 54 can be inserted therethrough. Note that in the example illustrated in FIG. 2, three screw holes 34 of the same shape are formed.

The knob falling-off prevention member 40 is a member that can switch between a first state of making the knob 50 detachable from a main body of the lens barrel 100 and a second state of making the knob 50 non-detachable from the main body of the lens barrel 100. Here, making the knob 50 detachable means making the knob 50 detachable when the screw is loosened. Further, making the knob 50 non-detachable means making the knob 50 non-detachable even when the screw is loosened.

In the example illustrated in FIG. 3, the knob falling-off prevention member 40 is a member having a main body portion 41, a screw hole 42, and the keyhole 43.

The main body portion 41 is a member which is connected to an outer peripheral portion of a distal end portion of the first barrel 20 and in which the screw hole 42 and the keyhole 43 are formed. Here, the main body portion 41 is an annular member, and a portion of the main body portion 41 where the screw hole 42 and the keyhole 43 are formed can be housed inside the screw hole forming portion 31. That is, the portion of the main body portion 41 has a smaller diameter than the screw hole forming portion 31.

The screw hole 42 is a hole for fixing the second barrel 30 and the knob falling-off prevention member 40. A screw groove corresponding to the fixing screw is formed in an inner periphery of the screw hole 42. A diameter of the screw hole 42 is equal to or less than the length in a short direction of the elongated hole 33. Note that a method for fixing the second barrel 30 and the knob falling-off prevention member 40 is not limited to a fixing method using the screw hole 42.

The keyhole 43 is a hole formed by communicating a first hole 44 and a second hole 45. The first hole 44 is a hole through which the third body portion 54 of the knob 50 can be inserted. The second hole 45 is a hole through which the third body portion 54 of the knob 50 cannot be inserted. The knob falling-off prevention member 40 switches between the first state and the second state by changing a position of the keyhole 43 with respect to the second body portion 53 of the knob 50. Note that the shape of the first hole 44 is not particularly limited as long as the third body portion 54 of the knob 50 can be inserted. Further, the shape of the second hole 45 is not particularly limited as long as the third body portion 54 of the knob 50 cannot be inserted.

Note that in the example illustrated in FIG. 2, three keyholes 43 of the same shape are formed. Here, one of combinations of one screw hole 34 and one keyhole 43 is used for fixing the second barrel 30 and preventing the knob 50 from falling off. As described above, since the plurality of screw holes 34 and the plurality of keyholes 43 are formed, in a situation where a camera is fixedly provided in a manufacturing line, an inspection line, or the like of a factory, even in a case where it is difficult to change a direction of the lens barrel 100 at the time of adjusting the lens barrel 100, any one of the plurality of screw holes 34 and the plurality of keyholes 43 may be used, and thus adjustment work of the lens barrel 100 is easier than a case where only one screw hole 34 and one keyhole 43 are formed.

An example of each configuration of the screw hole forming portion 31, the knob falling-off prevention member 40, and the knob 50 has been described above. Next, an example of switching between the first state and the second state by the knob falling-off prevention member 40 will be described with reference to FIGS. 3 to 6.

FIGS. 3A and 3B and 4A and 4B are explanatory diagrams for explaining an example of the switching between the first state and the second state by the knob falling-off prevention member 40 corresponding to at least one of embodiments of the present invention. Hereinafter, a direction perpendicular to a central axis of the lens barrel 100 from the central axis is referred to as a vertical direction.

Figure 3A:
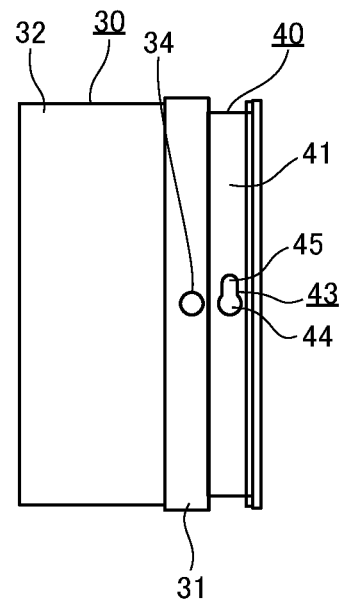
FIGS. 3A and 3B are explanatory diagrams for explaining an example of switching between a first state and a second state by the knob falling-off prevention member 40 corresponding to at least one of embodiments of the present invention.
Figure 3B:
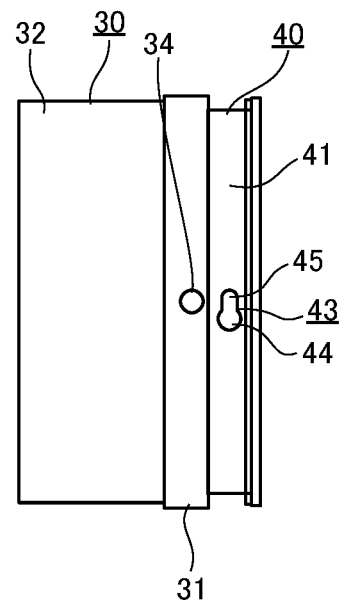

FIGS. 3A and 3B are diagrams illustrating a state in which positions of the second barrel 30 and the knob falling-off prevention member 40 are shifted in the axial direction with respect to the lens barrel 100 for the sake of explanation. As illustrated in FIGS. 3A and 3B, the position of the keyhole 43 with respect to the screw hole 34 is changed by rotating the knob falling-off prevention member 40 with respect to the circumferential direction of the lens barrel 100.

Figure 4A:
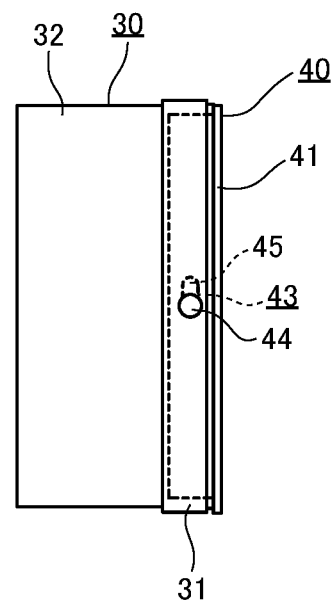
FIGS. 4A and 4B are explanatory diagrams for explaining an example of the switching between the first state and the second state by the knob falling-off prevention member 40 corresponding to at least one of embodiments of the present invention.
Figure 4B:
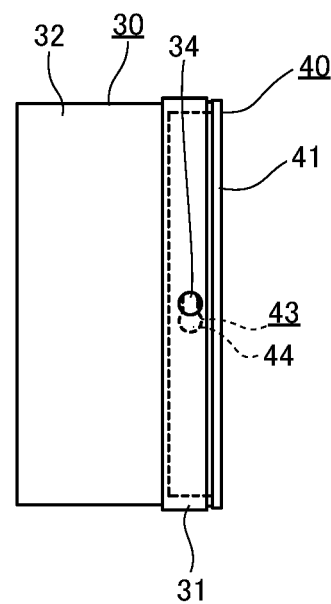

FIGS. 4A and 4B are diagrams of a state in which the knob falling-off prevention member 40 is mounted on the second barrel 30. As illustrated in FIGS. 4A and 4B, when the lens barrel 100 is used, the knob falling-off prevention member 40 is mounted inside the screw hole forming portion 31 (disposed inside the second barrel 30). Furthermore, the knob falling-off prevention member 40 and the screw hole forming portion 31 are adjusted such that both the screw hole 34 and the keyhole 43 are located in an outward direction from an approximate center of the lens barrel 100. That is, the screw hole 34 is adjusted to be located in the vertical direction of the keyhole 43.

The knob falling-off prevention member 40 is rotatable by a length in the longitudinal direction of the elongated hole 33 in the circumferential direction of the main body of the lens barrel 100 with respect to the second barrel 30. Further, when the knob 50 is inserted into the keyhole 43, the position of the keyhole 43 with respect to the second body portion 53 of the knob 50 rotates in the circumferential direction of the main body of the lens barrel 100 by rotating the knob falling-off prevention member 40. There are a case where the screw hole 34 is located in the vertical direction of the first hole 44 as illustrated in FIG. 4A and a case where the screw hole 34 is located in the vertical direction of the second hole 45 as illustrated in FIG. 4B. Here, a state illustrated in FIG. 4A is the first state, and a state illustrated in FIG. 4B is the second state.

FIGS. 5A and 5B and 6A and 6B are explanatory diagrams for explaining an example of falling-off prevention of the knob 50 by the knob falling-off prevention member 40 corresponding to at least one of embodiments of the present invention. FIGS. 5A and 5B and 6A and 6B illustrate cross-sectional diagrams of the screw hole forming portion 31 and the knob falling-off prevention member 40.

Figure 5A:
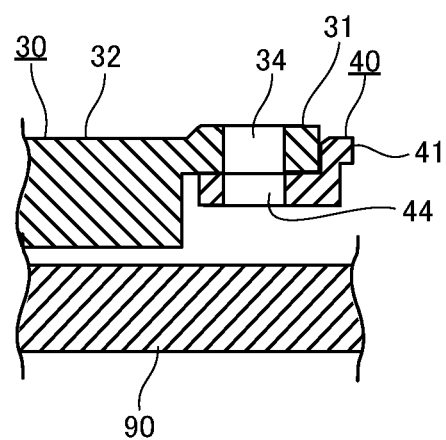
FIGS. 5A and 5B are explanatory diagrams for explaining an example of falling-off prevention of the knob 50 by the knob falling-off prevention member 40 corresponding to at least one of embodiments of the present invention.
Figure 5B:
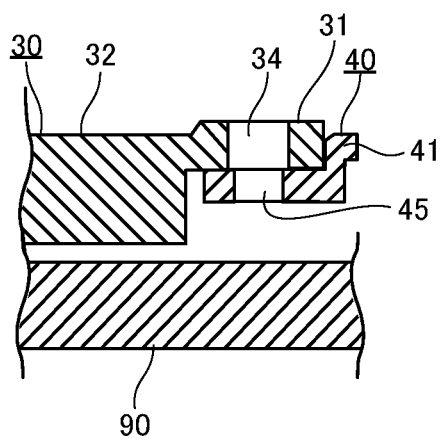

FIG. 5A corresponds to FIG. 4A, and the screw hole 34 is located in the vertical direction of the first hole 44. The first hole 44 is the hole through which the third body portion 54 of the knob 50 can be inserted. FIG. 5B corresponds to FIG. 4B, and the screw hole 34 is located in the vertical direction of the second hole 45. The second hole 45 is the hole through which the third body portion 54 of the knob 50 cannot be inserted.

Figure 6A:
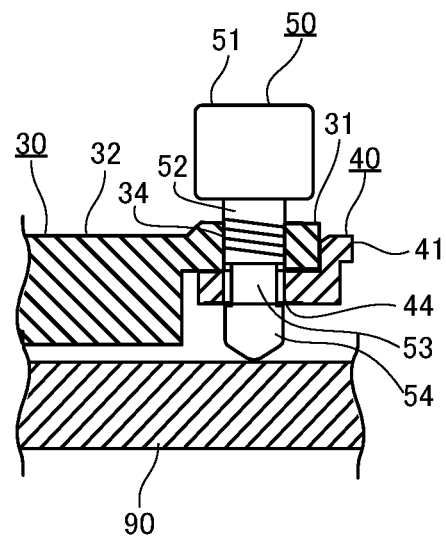
FIGS. 6A and 6B are explanatory diagrams for explaining an example of the falling-off prevention of the knob 50 by the knob falling-off prevention member 40 corresponding to at least one of embodiments of the present invention.

FIG. 6A is a cross-sectional diagram corresponding to FIG. 5A. The knob 50 is inserted through the screw hole 34 and the first hole 44. Since the first body portion 52, the second body portion 53, and the third body portion 54 can be inserted through the screw hole 34, the knob 50 can be inserted up to a position where the knob 50 comes into contact with the inner barrel 90.

Figure 6B:
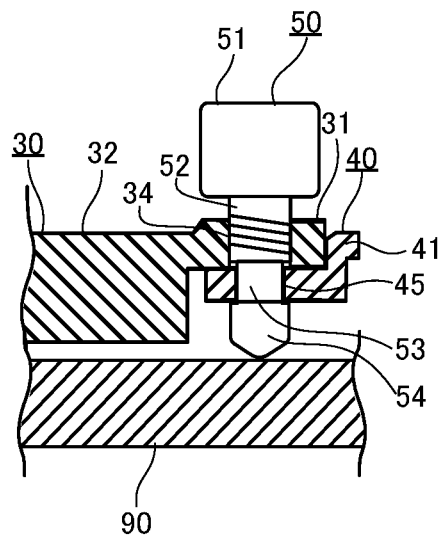

FIG. 6B corresponds to FIG. 5B, and is a cross-sectional diagram of a state where the knob falling-off prevention member 40 is rotated in the circumferential direction with respect to the second barrel 30 from a state of FIG. 6A. Specifically, for example, the operator moves the fixing screw screwed into the elongated hole 33 of the second barrel 30 and the screw hole 42 of the knob falling-off prevention member 40, so that the knob falling-off prevention member 40 rotates in the circumferential direction of the lens barrel 100 with respect to the second barrel 30. Note that as described above, the knob falling-off prevention member 40 is fixed by the fixing screw used in the screw hole 42. When the knob falling-off prevention member 40 is to be rotated, the fixing screw that is loosened more than when the knob falling-off prevention member 40 is fixed is moved.

In FIG. 6B, the knob 50 is inserted through the screw hole 34 and the second hole 45. Here, since the second hole 45 is a hole through which the third body portion 54 cannot be inserted, the knob 50 cannot be removed. Therefore, for example, at the time of adjusting the focus function or the iris function, it is possible to prevent the knob 50 from falling off when the screw of the knob 50 is loosened, and to prevent the screw of the knob 50 from being loosened.

In addition, by screwing the knob 50 and bringing the knob 50 into a state of pressing against the inner barrel 90, the second barrel 30 is fixed (locked) to the inner barrel 90 (that is, the main body of the lens barrel 100) by a frictional force between the third body portion 54 of the knob 50 and the inner barrel 90.

Furthermore, when the fixing screw is screwed to the screw hole 42 after the knob falling-off prevention member 40 is slid from the first state after insertion of the knob 50 and switched to the second state, a positional relationship between the second barrel 30 and the knob falling-off prevention member 40 is fixed. That is, the second state of the knob falling-off prevention member 40 is maintained. In this manner, by locking the second barrel 30 and the knob falling-off prevention member 40 as well, it is possible to adjust the focus function, the iris function, and the like in a state where the knob 50 is prevented from falling off.

As described above, as one aspect of the embodiment of the present invention, the lens barrel 100 includes: the operation member disposed to be rotatable in the circumferential direction with respect to the lens barrel body; and the knob 50 for restricting and fixing rotation of the operation member in the circumferential direction, in which the lens barrel 100 includes the knob falling-off prevention member 40 capable of switching between the first state of making the knob 50 detachable from the lens barrel body and the second state of making the knob 50 non-detachable from the lens barrel body, and thus the fixing member can be prevented from falling off.

Furthermore, if the lens barrel 100 according to the present invention is configured such that the knob 50 is the falling-off prevention screw including the first body portion 52 that is threaded, the second body portion 53 having a smaller diameter than that of the first body portion 52 and is not threaded, and the third body portion 54 having a larger diameter than that of the second body portion 53 and a diameter equal to or smaller than that of the first body portion 52, the operation member includes the screw hole 34 that can be screwed by the first body portion 52 of the knob 50, and the knob falling-off prevention member 40 includes a keyhole 43 formed by communicating the first hole 44 through which the third body portion 54 of the knob 50 can be inserted and the second hole 45 through which the third body portion 54 cannot be inserted, and switches between the first state and the second state by changing the position of the keyhole 43 with respect to the second body portion 53 of the knob 50, it is possible to easily switch between a state in which the knob 50 is detachable and a state in which the knob 50 is not detachable.

Furthermore, if the lens barrel 100 is configured such that the keyhole 43 is formed such that the first hole 44 and the second hole 45 communicate with each other in the circumferential direction of the knob falling-off prevention member 40, and the knob falling-off prevention member 40 is disposed rotatably in the circumferential direction, and switches between the first state and the second state by rotating the position of the keyhole 43 with respect to the second body portion 53 of the knob 50 in the circumferential direction, it is possible to perform the operation by the operation member and the switching operation between the first state and the second state by the similar movement.

Furthermore, if the lens barrel 100 is configured such that the knob falling-off prevention member is the knob falling-off prevention member 40 mounted on the lens barrel 100, the lens barrel 100 including: the operation member disposed to be rotatable in the circumferential direction with respect to the lens barrel body; and the knob 50 for restricting and fixing rotation of the operation member in the circumferential direction, in which the knob falling-off prevention member is switchable between the first state of making the knob 50 detachable from the lens barrel body and the second state of making the knob 50 non-detachable from the lens barrel body, it is possible to prevent the fixing member from falling off.

Note that in the above-described example, in the knob falling-off prevention member 40, the keyhole 43 is formed such that the first hole 44 and the second hole 45 communicate with each other in the circumferential direction of the main body of the lens barrel 100. However, a direction in which the keyhole is formed is not limited to such an example. Hereinafter, a modification of the knob falling-off prevention member will be described with reference to FIGS. 7 and 8A and 8B. Note that description of portions similar to the contents described in FIGS. 1 to 6 will be omitted.

Figure 7:
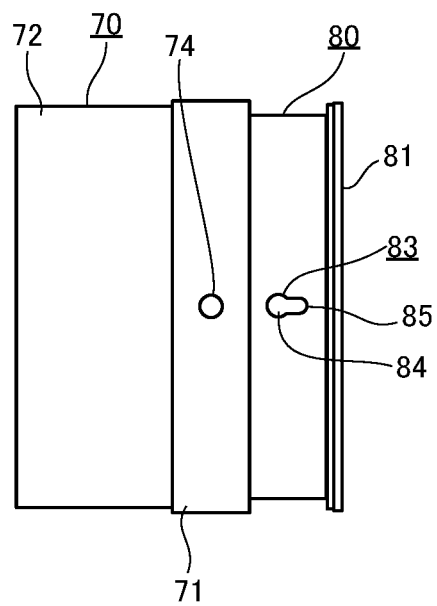
FIG. 7 is an explanatory diagram for explaining an example of a configuration of a second barrel 70 and a knob falling-off prevention member 80 corresponding to at least one of embodiments of the present invention.
Figure 8A:
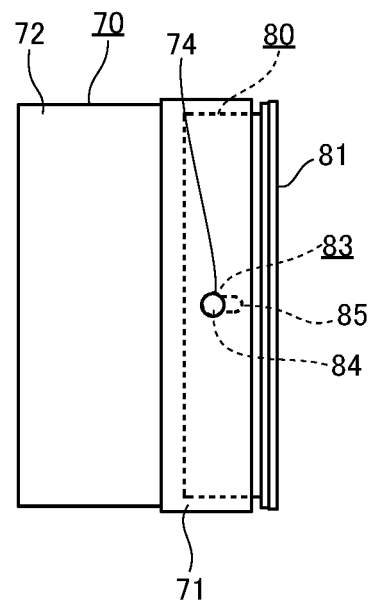
FIGS. 8A and 8B are explanatory diagrams for explaining an example of the configuration of the second barrel 70 and the knob falling-off prevention member 80 corresponding to at least one of embodiments of the present invention.
Figure 8B:
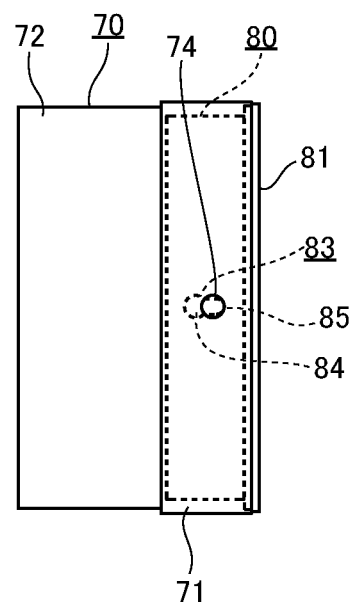

FIGS. 7 and 8A and 8B are explanatory diagrams for explaining an example of a configuration of a second barrel 70 and a knob falling-off prevention member 80 corresponding to at least one of embodiments of the present invention. In the example illustrated in FIGS. 7 and 8A and 8B, a moving direction of the knob falling-off prevention member when switching between the first state and the second state is different from that of the knob falling-off prevention member 40 described in FIGS. 1 to 6A and 6B.

A screw hole forming portion 71 and a screw hole 74 included in the second barrel 70 respectively correspond to the screw hole forming portion 31 and the screw hole 34. A main body portion 81, a screw hole 82 (not illustrated), and a keyhole 83 included in the knob falling-off prevention member 80 respectively correspond to the main body portion 41, the screw hole 42, and the keyhole 43. As illustrated in FIG. 7, the keyhole 83 is formed such that a first hole 84 and a second hole 85 communicate with each other in the axial direction of the knob falling-off prevention member 80 with respect to the lens barrel body.

FIGS. 8A and 8B illustrate the second barrel 70 and the knob falling-off prevention member 80 in the first state. Here, in FIG. 8A, the screw hole 74 is located in the vertical direction of the first hole 84. Further, in FIG. 8B, the screw hole 74 is located in the vertical direction of the second hole 85. In a state of FIG. 8A, the knob falling-off prevention member 80 moves in a direction with respect to a second barrel body portion 72, resulting in a state of FIG. 8B.

As described above, if the lens barrel 100 is configured such that the keyhole 83 is formed such that the first hole 84 and the second hole 85 communicate with each other in the axial direction of the knob falling-off prevention member 80 with respect to the lens barrel body, and the knob falling-off prevention member 80 is disposed movably in the axial direction with respect to the lens barrel body, and switches between the first state and the second state by moving the position of the keyhole 83 with respect to the second body portion 53 of the knob 50 in the axial direction, prevention of erroneous operation can be expected because the operation by the operation member and the switching operation between the first state and the second state are operations in different directions.

Second Embodiment

Hereinafter, an example of a lens barrel 200 according to a second embodiment of the present invention will be described with reference to FIGS. 9 to 15. As for the components denoted by the same reference numerals as those in the first embodiment, detailed description of the components similar to those described in the first embodiment will be omitted. In the second embodiment, a second barrel 230 and a knob falling-off prevention member 240 included in the lens barrel 200 respectively include screw portions that can be screwed together. The second barrel 230 and the knob falling-off prevention member 240 are connected by both screw portions.

Figure 9:
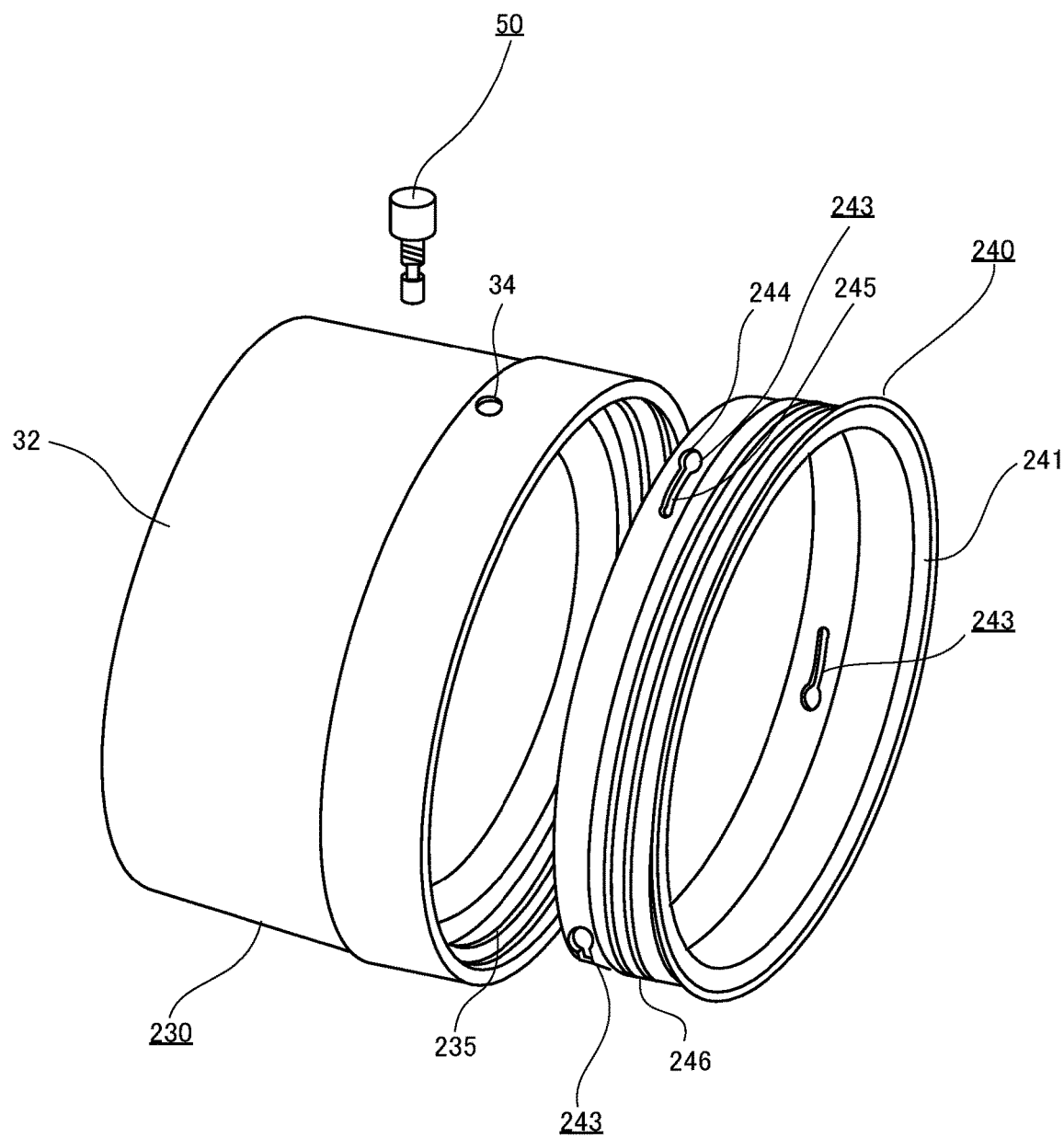
FIG. 9 is an explanatory diagram for explaining an example of each configuration of a second barrel 230, a knob falling-off prevention member 240, and the knob 50 corresponding to at least one of embodiments of the present invention.

FIG. 9 is an explanatory diagram for explaining an example of each configuration of the second barrel 230, the knob falling-off prevention member 240, and the knob 50 corresponding to at least one of embodiments of the present invention. FIG. 9 illustrates the second barrel 230, the knob falling-off prevention member 240, and the knob 250.

The second barrel 230 includes a screw hole forming portion 231 and the second barrel body portion 32. The screw hole forming portion 231 includes a screw portion 235 on an inner peripheral surface thereof. The screw portion 235 is formed on the inner peripheral surface of the screw hole forming portion 231 and is screwed with the knob falling-off prevention member 240 described later. In the following description, a process of rotating the knob falling-off prevention member 240 clockwise to tighten a screw portion 246 with respect to the screw portion 235 of the second barrel 230 when viewed from the knob falling-off prevention member 240 side is referred to as "screw tightening".

The knob falling-off prevention member 240 includes a main body portion 241, the screw hole 42, a keyhole 243, and the screw portion 246. In the main body portion 241, the screw portion 246 is formed on an outer peripheral surface on the first barrel 20 side. The screw portion 246 is screwed with the screw portion 235 of the second barrel 230. The keyhole 243 is a hole formed by communicating a first hole 244 and a second hole 245. The first hole 244 is a hole through which the third body portion 54 of the knob 50 can be inserted. The second hole 245 has a larger diameter than that of the second body portion 53 of the knob 50, but is a hole of a size that the third body portion 54 cannot be inserted through.

Here, in a state where the second barrel 230 and the knob falling-off prevention member 240 are screwed together by the screw portion 235 and the screw portion 246, the screw hole 34 and the keyhole 243 are located substantially on the same line in the circumferential direction with respect to the lens barrel 200.

FIGS. 10 to 14 are explanatory diagrams for explaining a mounting example of the knob falling-off prevention member 240 corresponding to at least one of embodiments of the present invention. Hereinafter, a direction perpendicular to a central axis of the lens barrel 200 from the central axis is referred to as a vertical direction.

Figure 10:
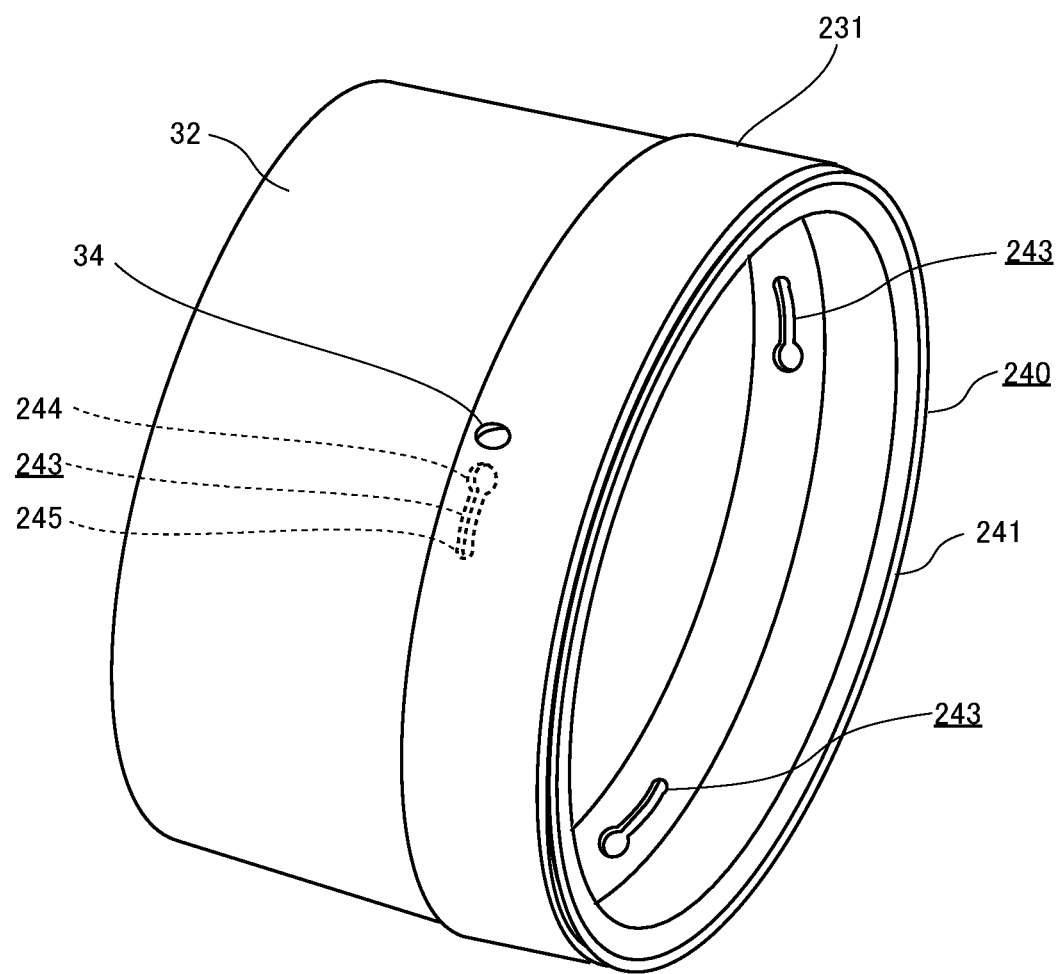
FIG. 10 is an explanatory diagram for explaining a mounting example of the knob falling-off prevention member 240 corresponding to at least one of embodiments of the present invention.
Figure 11:
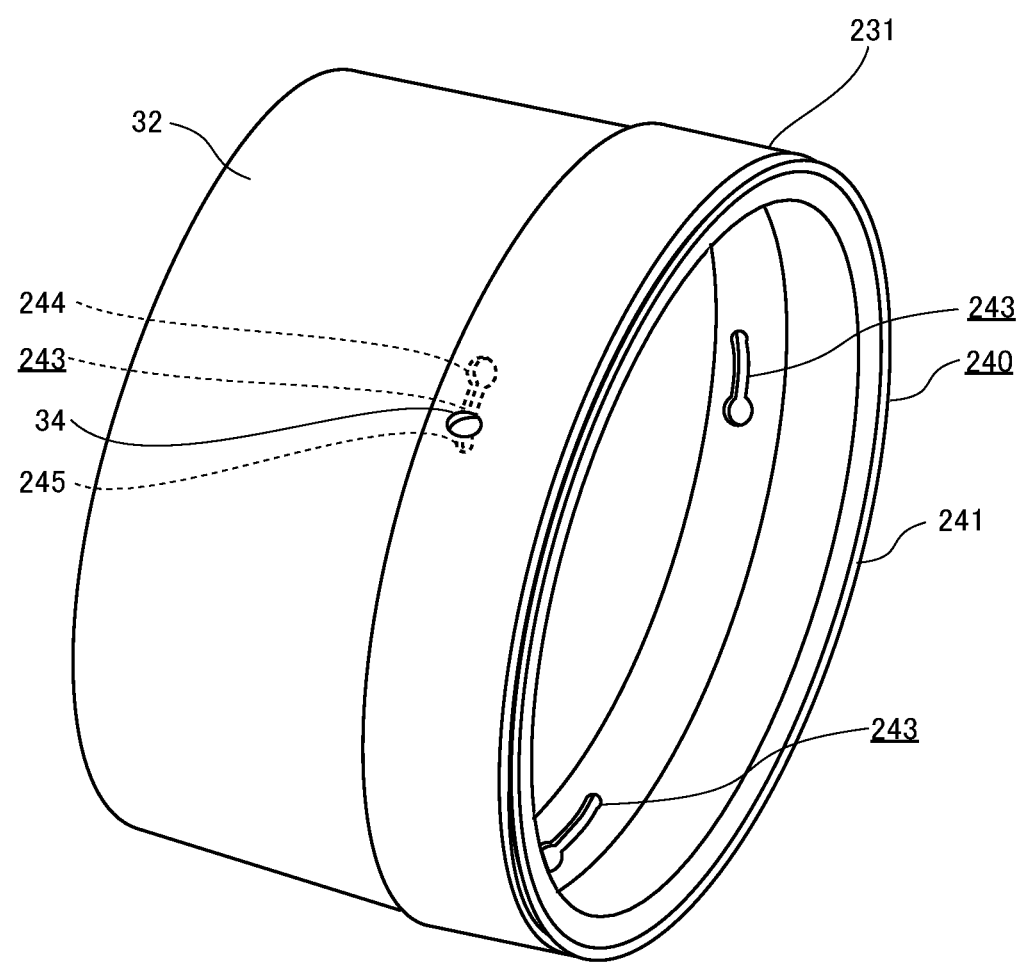
FIG. 11 is an explanatory diagram for explaining a mounting example of the knob falling-off prevention member 240 corresponding to at least one of embodiments of the present invention.

In FIG. 10, the second barrel 230 and the knob falling-off prevention member 240 are in a state of being about to be screwed. Here, by tightening the screw, the screw hole 34 is adjusted to be located in the vertical direction of the keyhole 243. FIG. 11 is a diagram of a state in which the screw is fully tightened. In this state, the screw hole 34 is located in the vertical direction of the second hole 245.

Figure 12:
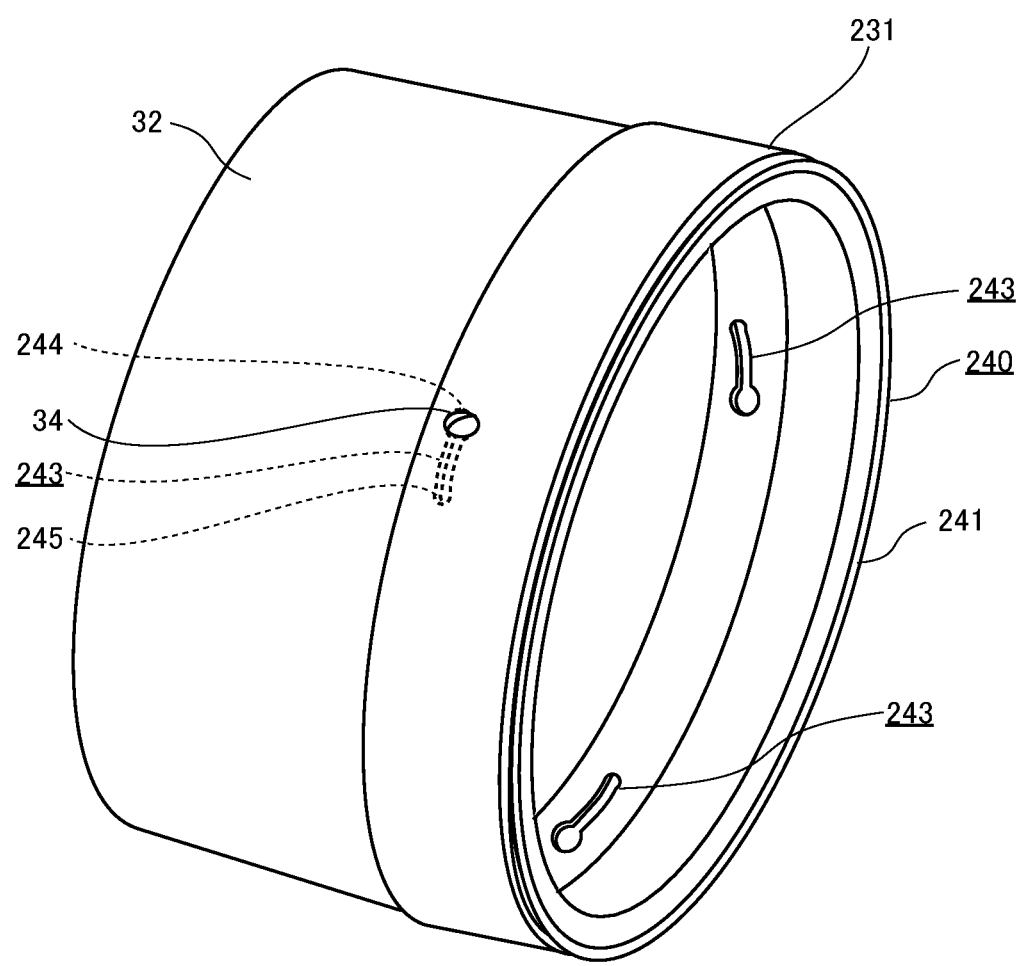
FIG. 12 is an explanatory diagram for explaining a mounting example of the knob falling-off prevention member 240 corresponding to at least one of embodiments of the present invention.
Figure 13:
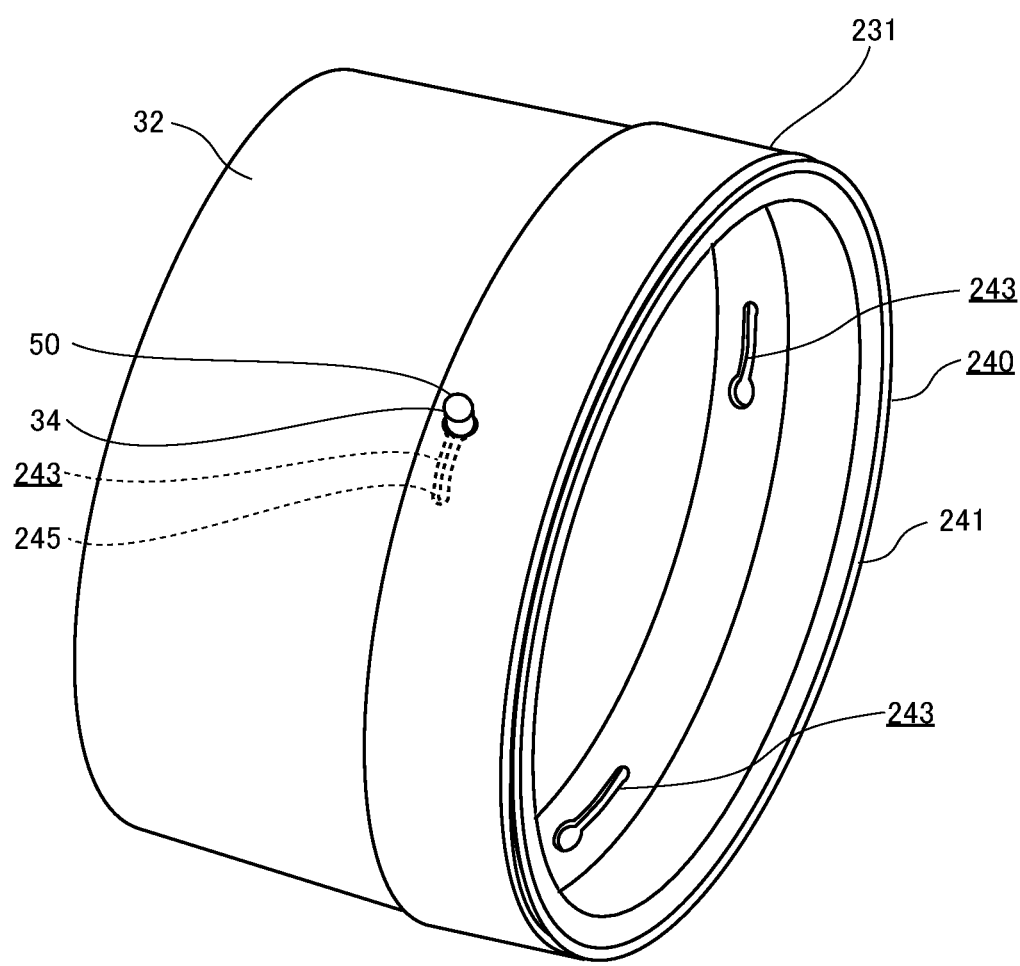
FIG. 13 is an explanatory diagram for explaining a mounting example of the knob falling-off prevention member 240 corresponding to at least one of embodiments of the present invention.

FIG. 12 is a diagram of a state in which the screw hole 34 is located in the vertical direction of the first hole 244. The state illustrated in FIG. 12 is a state in which the screw hole 34 is adjusted to be located in the vertical direction of the first hole 244 by slightly loosening the screw from a state of FIG. 11 in which the screw is tightened to the end once. That is, the state illustrated in FIG. 12 is a state in which the screw is not fully tightened. FIG. 13 is a diagram of a state in which the knob 50 is inserted through the screw hole 34 and the first hole 244 of the keyhole 243 in the state of FIG. 12.

Figure 14:
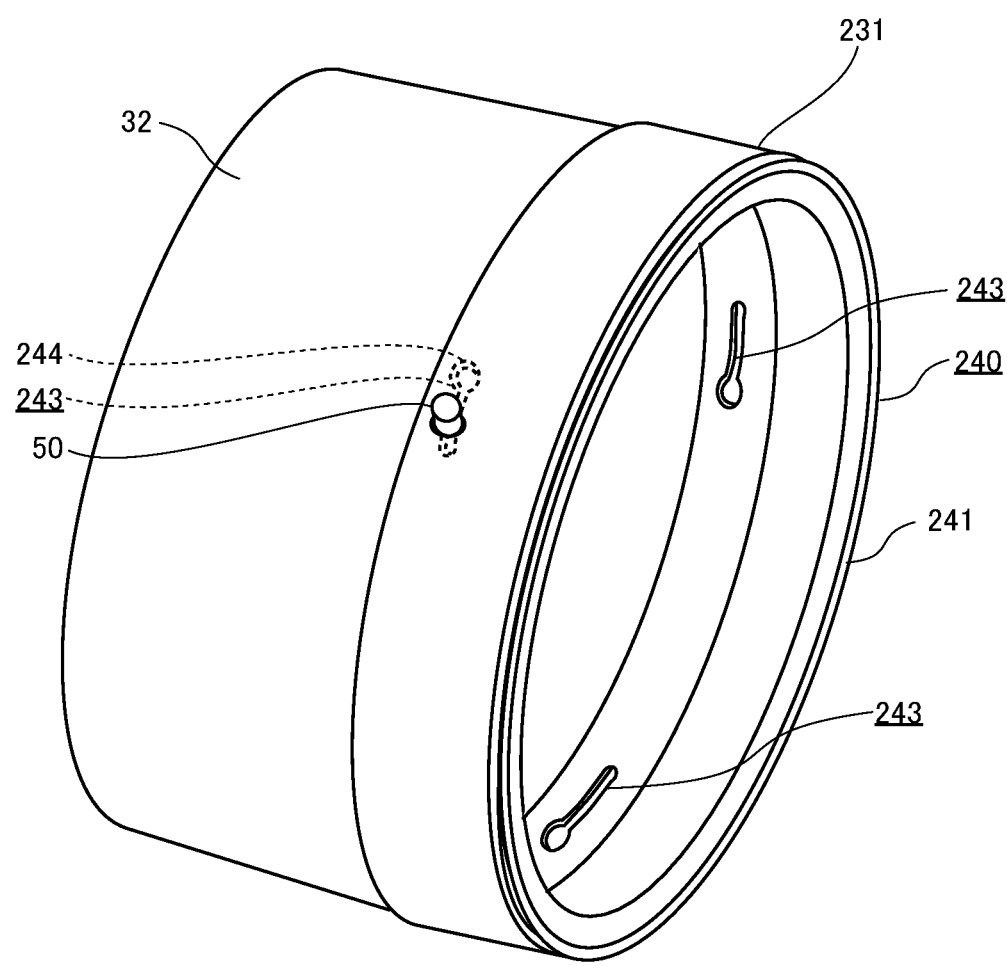
FIG. 14 is an explanatory diagram for explaining a mounting example of the knob falling-off prevention member 240 corresponding to at least one of embodiments of the present invention.

FIG. 14 is a diagram of a state in which the screw hole 34 is located in the vertical direction of the second hole 245 of the keyhole 243 and the knob 50 is prevented from falling off. FIG. 14 is a diagram of a state in which the screw is fully tightened from the state of FIG. 13. When the screw is tightened from the state of FIG. 13, the second hole 245 is fitted to the second body portion 53 of the knob 50 with play. Then, by fully tightening the screw to the end, the second hole 245 is fixed in a state of being fitted onto the second body portion 53 of the knob 50. In this state, even if the knob 50 is loosened, the third body portion 54 cannot pass through the second hole 245, so that the knob 50 cannot be removed.

Figure 15A:
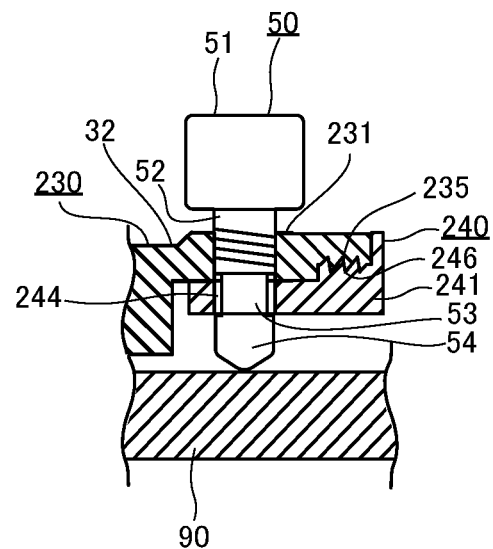
FIGS. 15A and 15B are explanatory diagrams for explaining an example of the falling-off prevention of the knob 50 by the knob falling-off prevention member 240 corresponding to at least one of embodiments of the present invention.
Figure 15B:
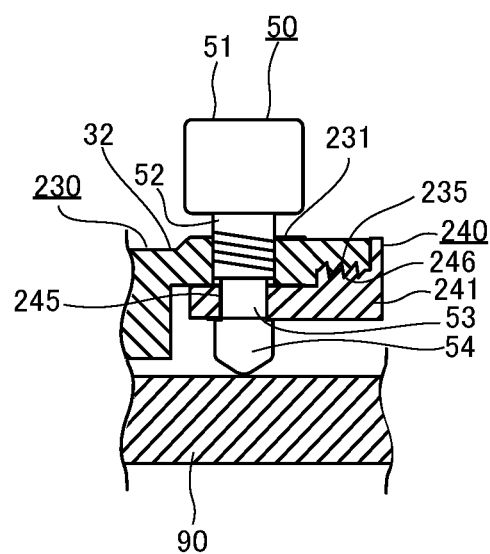

FIGS. 15A and 15B are explanatory diagrams for explaining an example of the falling-off prevention of the knob 50 by the knob falling-off prevention member 240 corresponding to at least one of embodiments of the present invention. FIGS. 15A and 15B illustrate cross-sectional diagrams of the screw hole forming portion 231 and the knob falling-off prevention member 240. FIG. 15A corresponds to FIG. 13, and the screw hole 34 is located in the vertical direction of the first hole 244. FIG. 15B corresponds to FIG. 14, and the screw hole 34 is located in the vertical direction of the second hole 245. That is, a state of FIG. 15A is the first state, and a state of FIG. 15B is the second state. As illustrated in FIGS. 15A and 15B, the second barrel 230 and the knob falling-off prevention member 240 are screwed together respectively by the screw portion 235 and the screw portion 246.

As described above, in the lens barrel 200, the second barrel 230 and the knob falling-off prevention member 240 include the screw portions that can be screwed together, and if the second hole 245 is fitted onto the second body portion 53 of the knob 50 with slight play when the screw is tightened, the third body portion 54 cannot pass through the second hole 245 even if the knob 50 is loosened, so that connection between the second barrel 230 and the knob falling-off prevention member 240 and a falling-off prevention state of the knob 50 can be maintained.

Note that a length of the second hole 245 may be any length, but it is preferable to have a certain length so that the falling-off prevention state can be maintained even if the screw is slightly loosened. By forming the second hole 245 with a length that can maintain the falling-off prevention state even if the screw is slightly loosened, it is possible to prevent the knob 50 from being inserted through the first hole 244, and as a result, it is possible to more reliably prevent the knob 50 from falling off from a main body of the lens barrel 200.

Third Embodiment

The knob falling-off prevention member employed in the first embodiment and the second embodiment is in a rotatable state in order to switch the state. The fact that the switching can be performed means that there remains a risk that the knob falling-off prevention member is in the first state and the knob 50 falls off. Therefore, the second barrel and the knob falling-off prevention member may be fixed together in order to prevent the knob from falling off. Hereinafter, the fixing between the second barrel and the knob falling-off prevention member will be described by taking the second embodiment as an example.

Hereinafter, an example of a lens barrel 300 according to a third embodiment of the present invention will be described with reference to FIGS. 16A-16C. The third embodiment has a basic structure in common with the second embodiment, but is an embodiment provided with a further fixing structure. As for the components denoted by the same reference numerals as those in the second embodiment, detailed description of the components similar to those described in the second embodiment will be omitted. Further, in the following description, a direction perpendicular to a central axis of the lens barrel 300 from the central axis is referred to as a vertical direction.

Figure 16A:
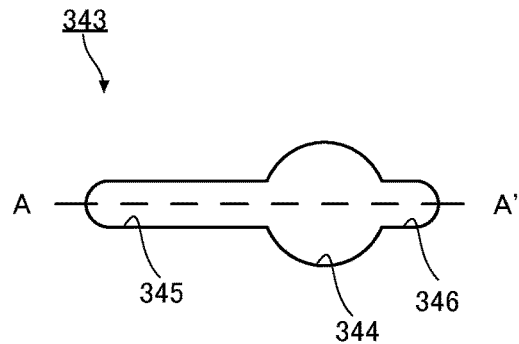
FIGS. 16A-16C are explanatory diagrams for explaining an example of a keyhole 343 corresponding to at least one of embodiments of the present invention.
Figure 16B:
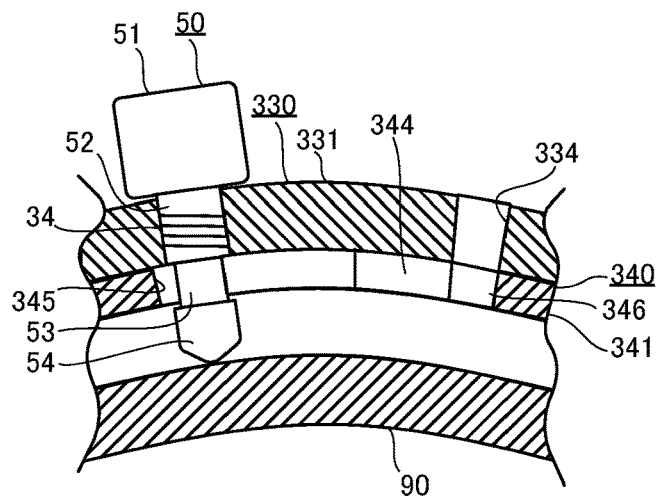
Figure 16C:
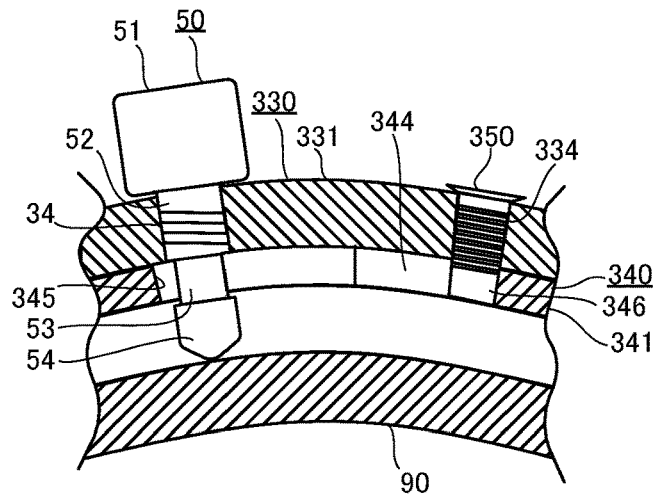

FIGS. 16A-16C are explanatory diagrams for explaining an example of a keyhole 343 corresponding to at least one of embodiments of the present invention. In the third embodiment, the knob falling-off prevention member 340 included in the lens barrel 300 has the keyhole 343 formed by communicating a first hole 344, a second hole 345, and a third hole 346.

FIG. 16A illustrates the keyhole 343. The first hole 344 and the second hole 345 correspond to the first hole 44 and the second hole 45 in the first embodiment and the first hole 244 and the second hole 245 in the second embodiment.

The third hole 346 is a hole communicating with the first hole 344 and formed at a position facing the second hole 345 via the first hole 344. The third hole 346 is formed so that a predetermined member can be inserted. The predetermined member is, for example, a screw.

FIGS. 16B and 16C are explanatory diagrams for explaining an example of the falling-off prevention of the knob 50 by the knob falling-off prevention member 340, and are cross-sectional diagrams taken along a plane A-A' illustrated in FIG. 16A. FIG. 16B illustrates a state in which the second hole 345 is fixed in a state of being fitted onto the second body portion 53 of the knob 50, similarly to a state in which the screw is fully tightened in the second embodiment. In addition, a screw hole 334 is formed in a screw hole forming portion 331 separately from the screw hole 34 for inserting the knob 50. In FIG. 16B, the screw hole 334 is located in the vertical direction of the third hole 346.

In FIG. 16C, a screw 350 is screwed into the screw hole 334 and the third hole 346. The screw 350 is an example of a predetermined member. In a state of FIG. 16C, since a positional relationship between the second barrel 330 and the knob falling-off prevention member 340 is fixed by the screw 350 and cannot be loosened, the position of the knob 50 with respect to the keyhole 343 is fixed.

As described above, in the lens barrel 300, if the knob falling-off prevention member 340 is configured to have the keyhole 343 formed by communicating the first hole 344, the second hole 345, and the third hole 346, a fixed state between the second barrel 330 and the knob falling-off prevention member 340 can be maintained, and a positional relationship of the knob 50 to the keyhole 343 is maintained, so that the knob falling-off prevention member 340 can be prevented from being in the first state, and as a result, the knob 50 can be reliably prevented from falling off from the main body of the lens barrel 300.

Note that in the above description, the third hole 346 is a hole communicating with the second hole 345, but a formation position of the third hole 346 is not limited thereto as long as the third hole is in a position where it can communicate with the screw hole 334 in a state where the screw hole 34 and the second hole 345 communicate with each other. For example, the third hole may be formed at a position away from the second hole 345 without communicating therewith. Even when the third hole 346 is formed at a position away from the second hole 345, the second barrel 330 and the knob falling-off prevention member 340 are fixed to the screw hole 334, so that it is possible to reliably prevent the knob 50 from falling off from the main body of the lens barrel 300. Further, the method for fixing the predetermined member is not limited to a method of screwing the member, and examples of other methods include a method of fixing the predetermined member to the second barrel 330 and the knob falling-off prevention member 340 with an adhesive or the like to maintain a state in which the predetermined member is inserted into the third hole 346.

REFERENCE SIGNS LIST 100, 200, 300 lens barrel
10 mounting portion
20 first barrel (operation member)
21 screw hole forming portion
22 first barrel body portion
30, 70, 230, 330 second barrel (operation member)
31, 71, 231, 331 screw hole forming portion
32, 72 second barrel body portion
33, 73 elongated hole
34, 42, 82, 334 screw hole
40, 80, 240, 340 knob falling-off prevention member
41, 81, 241, 341 main body portion
43, 83, 243, 343 keyhole
44, 84, 244, 344 first hole
45, 85, 245, 345 second hole
235, 246 screw portion
346 third hole
350 screw
50 knob
51 holding portion
52 first body portion
53 second body portion
54 third body portion
60 lens hood
90 inner barrel

The invention claimed is:

1. A lens barrel, comprising:
an operation member disposed to be rotatable in a circumferential direction with respect to a lens barrel body; and
a knob for restricting and fixing rotation of the operation member in the circumferential direction, wherein
the lens barrel includes a knob falling-off prevention member capable of switching between a first state of making the knob detachable from the lens barrel body and a second state of making the knob non-detachable from the lens barrel body,
the knob is a falling-off prevention screw including a first body portion that is threaded, a second body portion having a smaller diameter than that of the first body portion and is not threaded, and a third body portion having a larger diameter than that of the second body portion and a diameter equal to or smaller than that of the first body portion,
the operation member includes a screw hole that can be screwed by the first body portion of the knob, and
the knob falling-off prevention member:
includes a keyhole formed by communicating a first hole through which the third body portion of the knob can be inserted and a second hole through which the third body portion cannot be inserted; and
switches between the first state and the second state by changing a position of the keyhole with respect to the second body portion of the knob.

2. The lens barrel according to claim 1, wherein
the keyhole is formed such that the first hole and the second hole communicate with each other in the circumferential direction of the knob falling-off prevention member, and
the knob falling-off prevention member:
is disposed rotatably in the circumferential direction; and
switches between the first state and the second state by rotating the position of the keyhole with respect to the second body portion of the knob in the circumferential direction.

3. The lens barrel according to claim 1, wherein
the keyhole is formed such that the first hole and the second hole communicate with each other in an axial direction of the knob falling-off prevention member with respect to the lens barrel body, and
the knob falling-off prevention member:
is disposed movably in the axial direction with respect to the lens barrel body; and
switches between the first state and the second state by moving the position of the keyhole with respect to the second body portion of the knob in the axial direction.

4. A knob falling-off prevention member mounted on a lens barrel, the lens barrel comprising:
an operation member disposed to be rotatable in a circumferential direction with respect to a lens barrel body; and
a knob for restricting and fixing rotation of the operation member in the circumferential direction, wherein
the knob falling-off prevention member is switchable between a first state of making the knob detachable from the lens barrel body and a second state of making the knob non-detachable from the lens barrel body,
the knob is a falling-off prevention screw including a first body portion that is threaded, a second body portion having a smaller diameter than that of the first body portion and is not threaded, and a third body portion having a larger diameter than that of the second body portion and a diameter equal to or smaller than that of the first body portion,
the operation member includes a screw hole that can be screwed by the first body portion of the knob, and
the knob falling-off prevention member:

includes a keyhole formed by communicating a first hole through which the third body portion of the knob can be inserted and a second hole through which the third body portion cannot be inserted; and switches between the first state and the second state by changing a position of the keyhole with respect to the second body portion of the knob.

5. The knob falling-off prevention member according to claim 4, wherein the keyhole is formed such that the first hole and the second hole communicate with each other in the circumferential direction of the knob falling-off prevention member, and the knob falling-off prevention member:

is disposed rotatably in the circumferential direction; and switches between the first state and the second state by rotating the position of the keyhole with respect to the second body portion of the knob in the circumferential direction.

6. The knob falling-off prevention member according to claim 4, wherein the keyhole is formed such that the first hole and the second hole communicate with each other in an axial direction of the knob falling-off prevention member with respect to the lens barrel body, and the knob falling-off prevention member:

is disposed movably in the axial direction with respect to the lens barrel body; and switches between the first state and the second state by moving the position of the keyhole with respect to the second body portion of the knob in the axial direction.

* * * * *